3,547,826
INHIBITING OZONE DECOMPOSITION
Gerald M. Platz, Champaign, Ill., assignor, by mesne assignments, to Air Reduction Company, Incorporated, New York, N.Y., a corporation of New York
No Drawing. Original application Sept. 15, 1955, Ser. No. 534,878, now Patent No. 3,400,024, dated Sept. 3, 1968. Divided and this application Apr. 2, 1968, Ser. No. 718,242
Int. Cl. C06c *15/00*
U.S. Cl. 252—186     3 Claims

ABSTRACT OF THE DISCLOSURE

This invention relates to a stabilized composition consisting of oxygen and ozone and an effective amount of nitrous oxide to inhibit decomposition of said ozone.

---

This application is a division of application Ser. No. 534,878, filed on Sept. 15, 1955, now Pat. No. 3,400,024.

This invention relates to the storage, handling and utilization of ozone and more particularly relates to safely increasing concentrations of ozone or to rendering more safe presently utilized concentrations of ozone.

Prior to the present invention, it was determined that a gaseous ozone concentration of less than 14.3 volume percent in gaseous oxygen did not decompose rapidly in a self-sustaining manner when a high voltage spark was passed through the ozone-oxygen mixture. This determination established that ozone-in-oxygen concentrations of less than 14.3 volume percent of ozone at atmospheric temperature and pressure are very safe since the initiating-decomposition effect produced by a high voltage spark is seldom encountered in ozone handling practices. It was also determined that a gaseous ozone concentration of about 14.3–38 volume percent decomposed as a self-sustaining low-velocity decomposition wave, if subjected to a spark. Concentrations of 38 to 44 volume percent give a medium velocity decomposition wave or supported deflagration. Above 44 volume percent, high velocity detonation fronts were encountered when sparked. Similar considerations exist with reference to liquid mixtures of ozone and oxygen although higher ozone concentrations are permissible due to the lower energy level at the temperatures involved and the energy absorption capacity. With respect to a homogeneous liquid ozone-oxygen mixture, it was determined that high velocity decomposition did not occur when the mixture was subjected to a high voltage spark if the concentration by weight of the ozone was less than about 48% by weight. Thus, as is the case with gaseous ozone-oxygen mixtures, this liquid spark limit (48 weight percent) is considered very safe since an activating energy input, equivalent to a high voltage spark, will seldom be encountered. It is apparent that any means which increases the spark limit will also provide a greater margin of safety in the handling of ozone at concentrations above the ozone-oxygen spark limits since the tendency of ozone to decompose will be retarded. Since ozone has utility as a rocket propellant and since ozone is an excellent oxidant and reagent for chemical reactions, it is desirable that the hazards due to rapid decomposition be minimized and that the maximum-safety concentrations of ozone be increased.

The primary object of the present invention is the provision of means for reducing the tendency of ozone to decompose rapidly.

It is a further object to provide means whereby the spark-resistant percentage of ozone in a given volume can be increased.

The present invention accomplishes the foregoing objects of reducing the tendency of ozone to decompose rapidly and of increasing the safe ozone concentrations by the addition of certain inhibitors to ozone-oxygen mixtures. These inhibitors are dichlorodifluoromethane ($CCl_2F_2$), tetrafluoromethane ($CF_4$), nitrous oxide ($N_2O$), and sulfur hexafluoride ($SF_6$). For example, when a small amount of sulfur hexafluoride is added to a gaseous mixture of ozone and oxygen which is not resistant to a high voltage spark, the three component mixture becomes resistant to spark although the ozone exceeds 14.3% by volume.

All ozone-containing mixtures herein described are devoid of hydrocarbons or other sensitizing substances and are not contaminated by the handling apparatus. All references herein to percentages are percentages at standard temperature (20° C.) and pressure (14.7 p.s.i.a.). The oxygen used in tests herein described was purified of any trace of hydrocarbons in accordance with U.S. Pat. No. 2,700,648, issued on Jan. 25, 1955 to Thorp et al. The ozone was made from such oxygen and distilled in order to obtain 100 percent pure ozone. The names Freon 12, etc., hereinafter used, are tradenames for substances produced by the E. I. du Pont de Nemours & Co., Inc.

The above-mentioned inhibitors were discovered after extensive and numerous tests. The comparison standard which was used in discovering the instant inhibitors was the above-mentioned 14.3 volume percent (20.0 weight percent) ozone gas in oxygen gas. As above mentioned, this is the highest concentration of ozone which will not support an initiated decomposition or will be self-sustaining. Any composition with a higher percentage of gaseous ozone will self-sustain an initiated decomposition. This standard was obtained by numerous tests which involved passing a high voltage spark (about 6000 volts) through varied ozone-in-oxygen mixtures.

The gas phase test utilized to determine the 14.3 volume percent limit and to determine the inhibiting substances which decreased the tendency of ozone to decompose basically involved forming the desired gaseous mixture of ozone and oxygen or ozone, oxygen, and/or the inhibitor in a small explosion chamber, and passing a momentary high voltage spark ($\frac{1}{32}''$) between closely-spaced tungsten electrodes in the chamber. Mixing of the gases was assured by placing a piece of Dry Ice on the top of the chamber to cause thermal convection of the gases. The compositions of the gaseous mixtures were calculated from the initial pressure of ozone which was added first and the total final pressures of ozone and oxygen or of ozone and a known mixture of oxygen and/or inhibitor. The effect of the spark was determined by the change in pressure as indicated by a manometer and partial or total decomposition, if any, was determined from the pressure variations.

Twenty-some materials were tested and the aforementioned inhibitors were discovered to be effective as inhibitors. The non-inhibiting substances ranged typically from nitric oxide (NO), for example, which reacted violently upon initial contact with the ozone-oxygen mixture to neutral substances which exerted no influence on the location of the limit for decomposition of concentrated ozone-oxygen mixtures. Another type of substance was Freon 22 ($CHClF_2$) which reacted after initiated decomposition due to sparking. A fourth class of substances did not result in reactions upon either initial contact (like NO) or after initiated decomposition (like Freon 22) and were not neutral, but these substances did lower the decomposition limit. Argon, krypton and helium lowered the decomposition limit. The neutral substances or materials which exerted no influence were water vapor, carbon dioxide, chlorine, carbon tetrachloride, and nitrogen. Other substances which compared in effect to nitric oxide are hydrogen sulphide, ammonium, $CH_3CHF_3$, perfluorocyclobutane ($C_4F_8$) and boron trichloride ($BCl_3$). Other substances which are similar to Freon 22 in effect are Freon 21 ($CHCl_2F$), sulfur dioxide ($SO_2$) and hydrogen chloride (HCl).

In contrast to the foregoing, the above-mentioned inhibitors were found to have an inhibiting effect which permitted an increase in the ozone concentration to above 14.3% by volume. Further tests were made with the present inhibitors in order to determine their ranges of effectiveness. In order to do this, the amount of oxygen was decreased to zero quantity while the amount of the inhibitor and the amount of the ozone were increased.

The highest concentration of ozone in the respective inhibitor which did not decompose to any degree when subjected to spark is the spark-resistant limit of the particular inhibitor. For example, with sulfur hexafluoride, a mixture of 25% by volume ozone and 75% by volume sulfur hexafluoride did not decompose when subjected to sparking.

The shifting of the ozone limit for rapid decomposition due to sparking is in direct relation to the increasing amount of the inhibitor and the decreasing amount of oxygen. For example, a 50–50 mixture of sulfur hexafluoride (40.2 volume percent) and oxygen (40.2 volume percent) causes the decomposition limit to shift to about 19.6% by volume which is midway between the standard of 14.3% by volume and 25% by volume, the spark resistant limit for gaseous ozone-sulfur-hexafluoride mixtures.

When the volume percentage of ozone was increased above the spark limit and hence the percentage of the inhibitor was decreased, a range of partial decomposition extending to 100% decomposition exists. For example, with a mixture of sulfur hexafluoride and ozone, the ozone can be increased to 42% by volume before 100% decomposition occurs. The degree of partial decomposition between the spark limit (25%) and the total decomposition limit (42%) is a straight-line relationship. For example, if ozone constitutes 33.5% by volume of a gaseous mixture of ozone and sulfur hexafluoride, a spark will decompose 50% of the ozone.

The spark-resistant limits and the range of partial decomposition obtained with the instant inhibitors are shown in the following table:

| Compound | Formula | Limit Vol. percent | Range of partial decomposition, vol. percent |
| --- | --- | --- | --- |
| Sulphur hexafluoride | $SF_6$ | 25 | 25–42 |
| Freon 12 | $CCl_2F_2$ | 19 | 19–34 |
| Freon 14 | $CF_4$ | 19 | 19–34 |
| Nitrous oxide | $N_2O$ | 16.6 | 16.6–17.9 |

The limit values (third column) are the volume percentages of ozone in a mixture of ozone and the respective inhibitors below and at which no decomposition resulted from a spark. The ranges of partial decomposition show the volume percentages of ozone in the respective inhibitors from the point of no decomposition from sparking through increasing percentage decomposition to 100% decomposition from sparking. The degree of partial decomposition between the respective limits and 100% decomposition is a straight-line relationship for all of the inhibitors.

It is to be appreciated that the spark test is an extreme test since, as above mentioned, an equivalent amount of such rapid energy will seldom be imparted to an ozone-containing material. As a consequence, when a gaseous ozone-ozygen mixture in which the ozone is concentrated sufficiently as to have tendency to decompose rapidly contains a small but effective amount (about 5% by volume) of any of the present inhibitors, the ozone is rendered more stable. Stated differently, the ozone is less likely to decompose at a dangerous rate because the inhibitor will retard the tendency of ozone to decompose when the imparted energy is much less than a spark quantity. It is apparent that the present inhibitors also can be used as a carrier gas for ozone in a process in which the ozone is used in a reaction and the carrier gas is recirculated for admixing with additional ozone.

Since the melting point temperature of Freon 14 is −184° C., submerged-spark tests were made on liquid mixtures of ozone, oxygen, and Freon 14. These submerged-spark tests on liquid mixtures of ozone, oxygen, and Freon 14 which mixtures were maintained above −180° C. established that a composition by weight percentages of about 55% ozone, 39% oxygen, and 6% Freon 14 was not detonated by a high voltage spark. In other words, a minor amount of Freon 14 permitted an increase in the concentration of ozone in a homogeneous liquid mixture of ozone-oxygen to above the established maximum-safety limit of 48 weight percent. It was noted that when a small but effective amount of Freon 14 (at least about 1% by weight) was added to a homogeneous liquid ozone-oxygen containing an unstable amount of ozone, the Freon 14 had an inhibition effect or reduced the tendency of ozone to decompose rapidly. This permits, in the ordinary handling of ozone, an increase in ozone concentration to appreciably above 48 weight percent and gives a reasonable margin of safety. The temperature of about −180° C. (such as −165° C. with a corresponding pressure of 15 p.s.i.g.) is necessary because at −183° C., the liquid mixtures of ozone and oxygen when the ozone constitutes about 28 to 73% by weight separate into two layers with the bottom layer conaining about 72.4% by weight ozone. This concentration exceeds the present safe limit because of the recognized relative instability of ozone. The aforementioned liquid mixtures are preferably made by condensing Freon 14 in liquid oxygen and then condensing 100% pure ozone in the liquid Freon 14-oxygen.

A study of all of the substances involved in the tests clearly indicated certain common characteristics of the materials which are effective as an inhibitor. A basic requirement, of course, is that the inhibitor must exist in the same phase as the ozone-oxygen mixture. Thus, for the physical conditions and respective concentrations which are involved, a substance might be useful as a gas phase inhibitor but would not be useful as an inhibitor in liquid ozone-oxygen since this particular substance might be a solid under the conditions involved. In addition to the phase characteristic, the present inhibiting substances had no carbon-to-carbon, no multiple, and no carbon-to-hydrogen bonding. Also these substances were not cyclic in structure and contained no strained bond angles. Furthermore, a density for the inhibitor as close to the density of ozone for the phase (gaseous or liquid) under consideration and a gamma ratio (ratio of specific heats —$C_p/C_v$) for the inhibitor of less than 1.4 are indicated as necessary.

From the foregoing it is apparent that, when at least about 5% by volume of one of the inhibitors is added to gaseous mixtures of ozone and oxygen, there results an inhibition of any tendency of the ozone to decompose rapidly.

Thus, when the ozone constitutes more than 14.3% by volume and hence is unstable or sensitive to the input of energy, it is apparent that a small but effective amount of one of the instant inhibitors provides an improved margin of safety when added before the ozone concentration is sensitive to an input of energy.

While the specific embodiments of the invention have been described, it will be understood that changes may be made by those skilled in the art without departing from the invention as set forth in the following claims.

I claim:

1. A stabilized composition consisting essentially of oxygen and ozone in which said ozone is present in an amount of at least 20% by weight of said mixture and a small but effective amount of $N_2O$ to inhibit decomposition of said ozone.

2. A stabilized composition consisting essentially of oxygen and ozone in accordance with claim 1 and containing at least about 5% by volume of said $N_2O$.

3. A stabilized composition consisting essentially of at least about 20% ozone by weight and at least about 5% by volume of nitrous oxide to inhibit decomposition of said ozone.

References Cited

UNITED STATES PATENTS

| 2,962,449 | 11/1960 | Gaines | 252—186 |
| 3,008,902 | 11/1961 | Cook | 252—186 |

LEON D. ROSDOL, Primary Examiner

I. GLUCK, Assistant Examiner

U.S. Cl. X.R.

23—222; 149—1, 74; 204—126